(12) United States Patent
Hou et al.

(10) Patent No.: US 9,066,259 B2
(45) Date of Patent: Jun. 23, 2015

(54) METHOD FOR RE-BALANCING LOAD, METHOD FOR MIGRATING LOAD, DEVICE AND SYSTEM USING THE SAME

(75) Inventors: Zhiqiang Hou, Beijing (CN); Jing Wang, Beijing (CN); Kai Li, Beijing (CN)

(73) Assignee: CHINA MOBILE COMMUNICATION CORPORATION, Beijing (CN)

( * ) Notice: Subject to any disclaimer, the term of this patent is extended or adjusted under 35 U.S.C. 154(b) by 194 days.

(21) Appl. No.: 13/806,875

(22) PCT Filed: Jun. 29, 2011

(86) PCT No.: PCT/CN2011/076540
§ 371 (c)(1),
(2), (4) Date: Dec. 26, 2012

(87) PCT Pub. No.: WO2012/000431
PCT Pub. Date: Jan. 5, 2012

(65) Prior Publication Data
US 2013/0095834 A1 Apr. 18, 2013

(30) Foreign Application Priority Data

Jun. 29, 2010 (CN) .......................... 2010 1 0221037

(51) Int. Cl.
*H04W 36/00* (2009.01)
*H04W 4/00* (2009.01)
(Continued)

(52) U.S. Cl.
CPC .............. *H04W 28/08* (2013.01); *H04W 36/22* (2013.01)

(58) Field of Classification Search
CPC ......... H04W 4/16; H04W 4/02; H04W 64/00; H04W 8/26; H04W 4/00; H04W 12/02; H04W 12/08; H04W 4/20; H04W 8/10; H04W 8/16; H04W 4/12; H04W 4/14; H04W 72/0453; H04W 4/08; H04W 60/00; H04W 64/003; H04W 28/08; H04W 36/22; H04W 48/02; H04W 74/00; G06F 21/32; G06F 2221/2133; H04L 63/083; H04L 63/0861
USPC ............ 455/426.1, 436, 466, 552.1; 370/329, 370/331; 709/228, 241
See application file for complete search history.

(56) References Cited

U.S. PATENT DOCUMENTS 6,975,876 B1 * 12/2005 Cast et al. ..................... 455/466
8,477,730 B2 * 7/2013 Rajagopalan et al. ........ 370/331
(Continued)

FOREIGN PATENT DOCUMENTS

CN    101141785 A    3/2008
CN    101287287 A    10/2008
(Continued)

OTHER PUBLICATIONS

Chinese Office Action in the Counterpart Application No. 2010102210379, Dated Jun. 5, 2013 with English Translations, twenty three (23) pages.
(Continued)

*Primary Examiner* — Inder Mehra
(74) *Attorney, Agent, or Firm* — Nath, Goldberg & Meyer; Jerald L. Meyer; Sanjana Mangalagiri (57) ABSTRACT

The embodiment of the invention discloses a method for re-balancing a load, a method for migrating a load, a device and a system using the same. The method for re-balancing a load comprises: determining a type of a UE after receiving an access request from the UE by a first network device; determining whether the UE is to be migrated according to the type of the UE; and if yes, migrating the UE to a second network device whose type corresponds to the type of the UE. According to the embodiments of the present disclosure, the CN nodes may be balanced according to the type of the UE.

15 Claims, 4 Drawing Sheets

(51) Int. Cl.
*H04M 1/00* (2006.01)
*H04M 3/42* (2006.01)
*H04W 28/08* (2009.01)
*H04W 36/22* (2009.01)

(56) References Cited

U.S. PATENT DOCUMENTS

| 2003/0028644 | A1  | 2/2003  | Maguire et al. |         |
|--------------|-----|---------|----------------|---------|
| 2006/0128423 | A1* | 6/2006  | Horvath et al. | 455/552.1 |
| 2009/0003277 | A1* | 1/2009  | Uppili         | 370/331 |
| 2010/0195608 | A1* | 8/2010  | Ishizu et al.  | 370/329 |
| 2011/0096748 | A1* | 4/2011  | Meyer et al.   | 370/329 |
| 2012/0102226 | A1* | 4/2012  | Hopmann et al. | 709/241 |
| 2012/0259991 | A1* | 10/2012 | Rozinov et al. | 709/228 |

FOREIGN PATENT DOCUMENTS

| CN | 101291532 A | 10/2008 |
| CN | 101668279 A | 3/2010  |

OTHER PUBLICATIONS

Office Action corresponding to Chinese Application No. 201010221037.9, issued Nov. 7, 2013, with English Translation, thirty one (31) pages.

* cited by examiner

METHOD FOR RE-BALANCING LOAD, METHOD FOR MIGRATING LOAD, DEVICE AND SYSTEM USING THE SAME

This is a National Phase Application filed under 35 U.S.C. 371 as a national stage of PCT/CN2011/076540, filed Jun. 29, 2011, and claims priority from Chinese Application No. 201010221037.9, filed Jun. 29, 2010, the content of each of which is hereby incorporated by reference in its entirety.

BACKGROUND OF THE INVENTION

1. Field of the Invention

The present invention relates to a communication field, and particularly to a method for re-balancing a load, a method for migrating a load, a device and a system using the same.

2. Description of the Prior Art

A core network (CN) pool area refers to multiple wireless areas served by a group of same type CN nodes such as SGSN (Servicing GPRS Support Node) or MSC (Mobile Switching Center) or MME (Mobile Management Entity) simultaneously.

Figure 1:
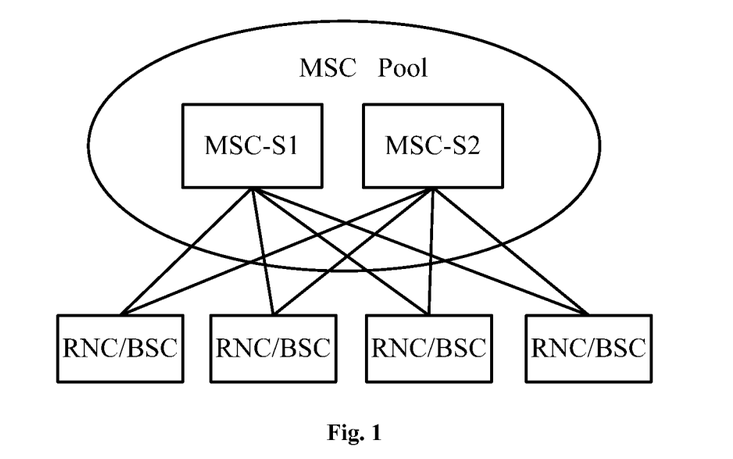
FIG. 1 is a schematic diagram showing a networking of a CN node pool according to prior art.

When a group of CN nodes serve one pool area, as shown in FIG. 1, each RAN (Radio Access Network) node (such as RNC (Radio Network Controller)/BSC (Base Station Controller)) in the pool area and CN nodes (such as MSC (Mobile Switching Center)) of the same type wireless system are all interconnected and multiple CN nodes share access requests from UEs (User Equipment) in the pool area. When any UE initially enters the pool area, the RAN node has NNSF (NAS, Node Selection Function) of NAS (Non access Stratum) and selects the CN node according to a load balancing principle and forwards the access request to corresponding CN node. In addition, the RAN node may set a WF (Weight Factor) according to capacity differences of CN nodes so that the CN node may be selected according to the difference between WFs.

When a UE moves in the pool area, the CN node serving the UE remains the same. After the UE registers in the CN, the CN node may allocate a temporary identifier for the UE. For the PS (Packet Switching) domain network of 2 G/3 G, the temporary identifier is P-TMSI (Packet-Temporary Mobile Subscriber Identity), while for the CS (Circuit Switching) domain network of 2 G/3 G, the temporary identifier is TMSI (Temporary Mobile Subscriber Identity). SGSN employs NRI (Network Resource Identifier) field in P-TMSI to identify itself, MSC employs NRI field in TMSI to identify itself, and MME (Mobility Management Entity) employs MMEI (Mobility Management Entity Identifier) field in GUTI (Globally Unique Temporary Identity) to identify itself. If the UE sends the access request in the same area once more after receiving the temporary identifier, the RAN node will select the CN node served last time according to the NRI or MMEI.

If a certain CN node serving in a pool area needs to migrate the UE it is serving to another CN node in the same pool area, it will use the load re-balancing technique.

For 2 G/3 G network, the CN node (SGSN or MSN) may set the NRI field to NULL NRI (Null Network Resource Identifier) or designate the NRI field to an identifier of another CN node and then feeds back the result to the UE so as to urge the UE to initiate a second access request as soon as possible. When the UE initiates the second access request, the RAN node will not forward the second access request to the CN node serving last time.

For LTE (Long Term Evolution) network, the CN node (MME) sets MMEI as an identifier of another CN node and feeds back the result to the UE so as to urge the UE to initiate a second access request as soon as possible. Or the MME may signal the RAN node that the load re-balancing is requested by the UE. Then the RAN node will notify the UE of the fact and urge the UE to initiate a second access request. When the UE initiates the second access request, the RAN node will not forward the second access request to the CN node serving last time.

The conventional technique has at least the following disadvantages: according to a conventional load re-balancing mechanism, the CN node may migrate the UE only according to a load status and for a specified UE with a special need, no specific process has been provided.

SUMMARY OF THE INVENTION

Embodiments of the present disclosure provide a method for re-balancing a load, a method for migrating a load, a device and system using the same to realize the re-balancing of the network device according to a type of a UE.

An embodiment of the present disclosure provides a method for re-balancing a load, comprising: determining a type of a UE after receiving an access request from the UE by a first network device; determining whether the UE is to be migrated according to the type of the UE; and if yes, migrating the UE to a second network device whose type corresponds to the type of the UE.

An embodiment of the present disclosure provides a network device, comprising: an obtaining module, configured to determine a type of a UE after receiving an access request from the UE; and a migrating module, configured to migrate the UE to a second network device whose type corresponds to the type of the UE when determining the UE is to be migrated according to the type of the UE.

According to the above embodiments, when the network device receives the access request from the UE, it may determine the type of the UE and re-balance a suitable network device according to the type of the UE, which satisfies the need of using the dedicated type network device for the specified type UE.

An embodiment of the present disclosure provides a method for migrating a load, comprising: determining a type of a UE being served; and migrating the UE to a network device whose type corresponds to the type of the UE according to the type of the UE.

An embodiment of the present disclosure provides a network device, comprising: a determining module, configured to determine a type of a UE being served; and a migrating module, configured to migrate the UE to a network device whose type corresponds to the type of the UE according to the type of the UE.

According to the above embodiments, when the network device migrates the load, it may re-balance the UE to a corresponding network device according to the type of the UE so that a suitable network device may be re-balanced according to the type of the UE, which satisfies the need of using the dedicated type CN node for the specified type UE.

An embodiment of the present disclosure provides a method for migrating a load, applicable to a non-dedicated type network device which supports only a non-specified UE or to a dedicated type network device which supports only a specified type UE, comprising: selecting a second network device whose type is same as that of a first network device serving a UE when the UE is determined to be migrated; and migrating the UE to the second network device by the first network device.

An embodiment of the present disclosure provides a network device being a non-dedicated type network device which supports only a non-specified UE or a dedicated type network device which supports only a specified type UE, comprising: a selecting module, configured to select a second network device whose type is same as that of a first network device serving a UE when the UE is determined to be migrated; and a migrating module, configured to migrate the UE to the second network device selected by the selecting module.

According to the above embodiments, when the dedicated type network device which supports only the specified type UE or the non-dedicated type network device which supports only the non-specified type UE re-balances the load, the UE may be migrated to a network device whose type is same as that of the network device serving the UE so that it ensures that the UE served by a certain type of network device may be continuously served by a same type of network device, which satisfies the need of using the dedicated type CN node for the specified type UE.

An embodiment of the present disclosure provides a communication system, comprising an access node and a network device, wherein the access node is configured to forward an access request from a UE to the network device. The network device is configured to receive the access request from the UE, obtain a type of the UE, determine whether the UE is to be migrated according to the type of the UE and if yes, migrate the UE to a network device of a corresponding type.

DETAILED DESCRIPTION OF THE PREFERRED EMBODIMENTS

In order to solve the existed problems of the conventional technology, an embodiment of the present disclosure provides a technical solution which may be applied for balancing a CN node in a CN pool. In the embodiment of the present disclosure, when the CN node is triggered to migrate a UE, it migrates the UE according to the type of the UE. Specifically, it migrates a specified type UE to a dedicated type CN node and migrates a non-specified type UE to a non-dedicated type CN node. In addition, a load balancing mechanism and a load re-balancing mechanism may be combined. Therefore, on one side, the UE may be migrated according to the type of the UE; on the other side, a load balancing may be achieved between different CN nodes in the CN pool.

Determining by a network device that the UE is to be migrated according to the type of the UE specifically comprises: when the type of the UE and the type of the network device receiving an access request do match, determining the UE is not to be migrated; and when the type of the UE and the type of the network device receiving an access request do not match, determining the UE is to be migrated.

In the embodiment of the present disclosure, the CN nodes in the CN pool may be classified into two types, dedicated type CN nodes and non-dedicated CN nodes. The UEs may be classified into two types also, specified type UE and non-specified type UE. Here, the dedicated type CN node mainly serves the specified type UE and may also serve the non-specified type UE; the non-dedicated CN node may only serves the non-specified type UE. For example, if the specified type UE requests to access the non-dedicated type CN node, the non-dedicated type CN node needs to migrate the specified type UE to the dedicated type CN node.

In the embodiment of the present disclosure, the subscriber's contract information may be stored in a subscriber information storage device at the CN node or the subscriber information may be configured at the CN node. The CN node may search the subscriber's contract information or the subscriber information or the UE information configured at the CN node to determine the type of the UE. For the 2 G/3 G network, the subscriber information storage device may be the HLR (Home Location Register) or the HSS (Home Subscriber Server). For the LTE network, the subscriber information storage device may be the HSS. The specified UE may be the UE of the Internet or may be the UE of the home-area network.

The technical solution of the embodiments of the present disclosure will be described thoroughly and completely with reference to the accompanied drawings and actual scenarios.

Figure 2:
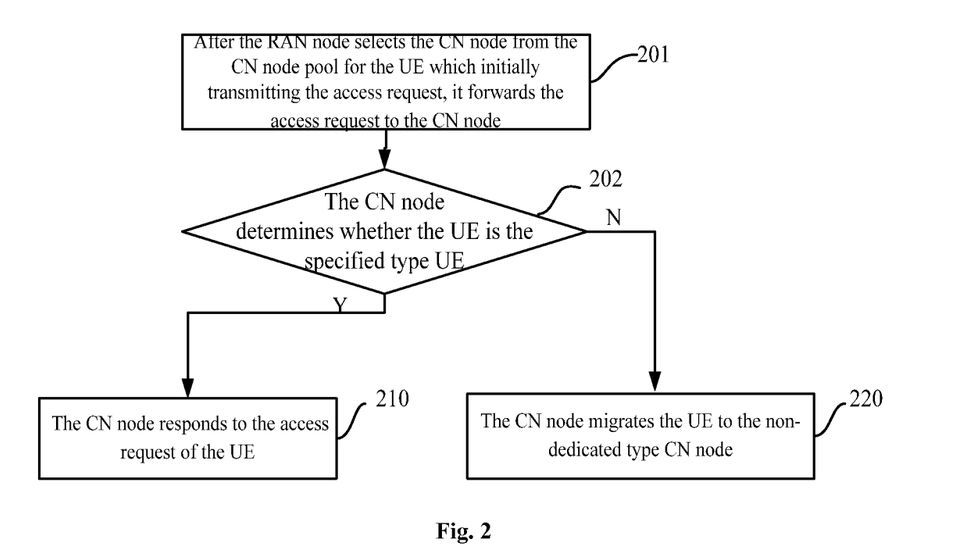
FIG. 2 is a flow chart showing a method for balancing a CN node by a dedicated CN node triggered by an access request from a UE.

FIG. 2 is a flow chart showing a method for balancing a CN node in the CN pool according to an embodiment of the present disclosure, which describes a procedure for balancing a CN node triggered by the UE which sends an access request to the dedicated type CN node. The method specifically comprises the following steps.

In step 201, after the RAN node selects the CN node from the CN node pool for the UE which initially transmits the access request, it forwards the access request to the CN node.

Specifically, when the UE first initiates the access request in the pool area, the RAN node may forward the access request to a selected CN node according to the load balancing mechanism and the selected CN node may be a dedicated type CN node or a non-dedicated type CN node. In this embodiment, the dedicated type CN node will be taken as an example.

In step 202, after the CN node receives the access request, it determines whether the UE which initiates the access request is a specified type UE, and if yes, step 210 is performed; otherwise, step 220 is performed.

Specifically, the CN node may search the subscriber's contract information stored in the subscriber information storage device and determine whether the UE is the specified type UE. Specifically, the CN node may determine according to the identifier information which identify whether the UE is the specified type UE in the subscriber contract information. If the subscriber information is configured at the CN node, the CN node may determine whether the UE is the specified type UE according to the subscriber information. Specifically, the number segment range to which the subscriber's number belongs for the specified type UE may be configured at the CN node or the number segment range to which the device number belongs for the specified type UE may be configured. The CN node may determine whether the UE is the specified type UE based on the determination result of whether the communication number (subscriber number or device number) of the UE which initiates the access request belong to the number segment range. The communication number may be the IMSI (International Mobile Subscriber Identification Number) or the MSISDN (Mobile Subscriber International ISDN/PSTN number) or the IMEI (International Mobile Equipment Identity).

In step 210, when the UE is the specified type UE, the CN node responds to the access request of the specified type UE, i.e. enables the specified type UE to access the current CN node which receives the access request.

In step 220, when the UE is the non-specified type UE, the CN node migrates the non-specified type UE to the non-dedicated type CN node.

Specifically, the current CN node (dedicated type CN node) sets the NRI or the MMEI field in the subscriber's temporary identifier to the non-dedicated type CN node identifier. If there are multiple non-dedicated type CN nodes in the pool area, the current CN node selects a non-dedicated type CN node according to the load balancing method specified by the NNSF and sets the NRI or the MMEI field by this non-dedicated type CN node. Then, the current CN node employs the load re-balancing mechanism to urge the UE to initiate a second access request. During this process, the current CN node sends the subscriber temporary identifier set by the non-dedicated type CN node identifier to the UE. After the UE initiates the second access request, the NNSF at the wireless node forwards the second access request to a corresponding CN node according to the non-dedicated type CN node identifier.

Some dedicated type CN node may also support the access request from the non-specified type UE, i.e. may serve the non-specified type UE. In this regard, in another embodiment of the present disclosure, the flow in FIG. 2 may be improved as follows.

If the current CN node determines the UE which initiates the access request is the non-specified type UE and the CN node supports the access request from the non-specified type UE, the non-specified type UE does not need to be migrated to another CN node, but the dedicated type CN node responds to the access request from the non-specified type UE, i.e. enables the non-specified type UE to access the current CN node. Thus the migration of the UE may be reduced, the network interactivity may be reduced, the network overhead may be saved and the delay caused by accessing the requested service may be shortened.

From the above description, it may be seen that when the CN node which has been initially balanced to the UE receives the access request from the UE, it may determine the CN node to serve the UE according to its own type and the type of the UE so that a suitable CN node may be balanced according to the type of the UE, which satisfies the need of employing the dedicated type CN node for the specified type UE. In addition, the load balancing mechanism and the load re-balancing mechanism are adopted in the embodiment of the present disclosure and therefore the load balancing between CN nodes may be achieved. Moreover, in the embodiment of the present disclosure, the subscriber's contract information or the subscriber information is configured at the device at the network side and the CN node determines whether the UE is the specified type UE according to the subscriber's contract information or the subscriber information, which may avoid reconstructing the devices both at the UE side and at the network side and is easy for implementation.

Figure 3:
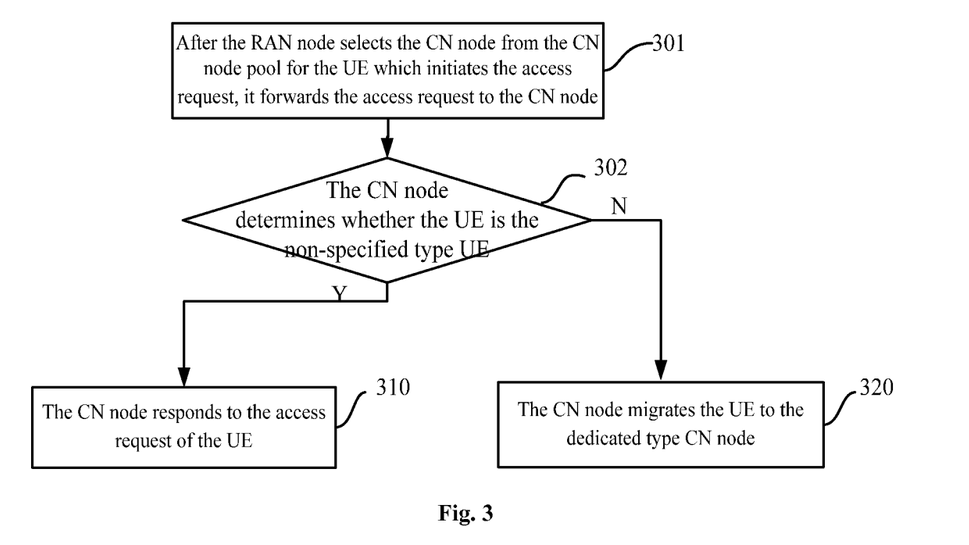
FIG. 3 is a flow chart showing a method for balancing a CN node by a non-dedicated CN node triggered by an access request from a UE.

FIG. 3 is a flow chart showing a method for balancing a CN node in the CN pool according to an embodiment of the present disclosure, which describes a procedure for balancing a CN node triggered by the UE which sends an access request to the non-dedicated type CN node. The method specifically comprises the following steps.

In step 301, after the RAN node selects a CN node from the CN node pool for the UE which initially transmitting the access request, it forwards the access request to the CN node. Specifically, when the UE first initiates the access request in the pool area, the RAN node may forward the access request to a selected CN node according to the load balancing mechanism and the selected CN node may be a dedicated type CN node or a non-dedicated type CN node. In this embodiment, the non-dedicated type CN node will be taken as an example.

In step 302, after the CN node receives the access request, it determines whether the UE which initiates the access request is a non-specified type UE and if yes, step 310 is performed; otherwise, step 320 is performed. The method for the CN node to determine the type of the UE is the same as that shown in FIG. 2 and will not be illustrated in detail here.

In step 310, when the UE is the non-specified type UE, the CN node responds to the access request of the non-specified type UE, i.e. enables the non-specified type UE to access the current CN node which receives the access request.

In step 320, when the UE is the specified type UE, the CN node migrates the specified type UE to the dedicated type CN node. The dedicated type CN node may only support the specified type UE or may support both the specified type UE and the non-specified type UE.

Specifically, the current CN node (non-dedicated type CN node) sets the NRI or the MMEI field in the subscriber's temporary identifier to the dedicated type CN node identifier. If there are multiple dedicated type CN nodes in the pool area, the current CN node selects a dedicated type CN node according to the load balancing method specified by the NNSF and sets the NRI or the MMEI field by this dedicated type CN node. Then, the current CN node employs the load re-balancing mechanism to urge the UE to initiate a second access request. During this process, the current CN node sends the subscriber temporary identifier set by the dedicated type CN node identifier to the UE. After the UE initiates the second access request, the NNSF at the wireless node forwards the second access request to a corresponding CN node according to the dedicated type CN node identifier.

From the above description, it may be seen that when the CN node which has been initially balanced to the UE receives the access request from the UE, it may determine the CN node to serve the UE according to its own type and the type of the UE so that a suitable CN node may be balanced according to the type of the UE, which satisfies the need of employing the dedicated type CN node for the specified type UE. In addition, the load balancing mechanism and the load re-balancing mechanism are adopted in the embodiment of the present disclosure and therefore the load balancing between CN nodes may be achieved. Moreover, in the embodiment of the present disclosure, the subscriber's contract information or the subscriber information is configured at the device at the network side and the CN node determines whether the UE is the specified type UE according to the subscriber's contract information or the subscriber information, which may avoid reconstructing the devices both at the UE side and at the network side and is easy for implementation.

Figure 4:
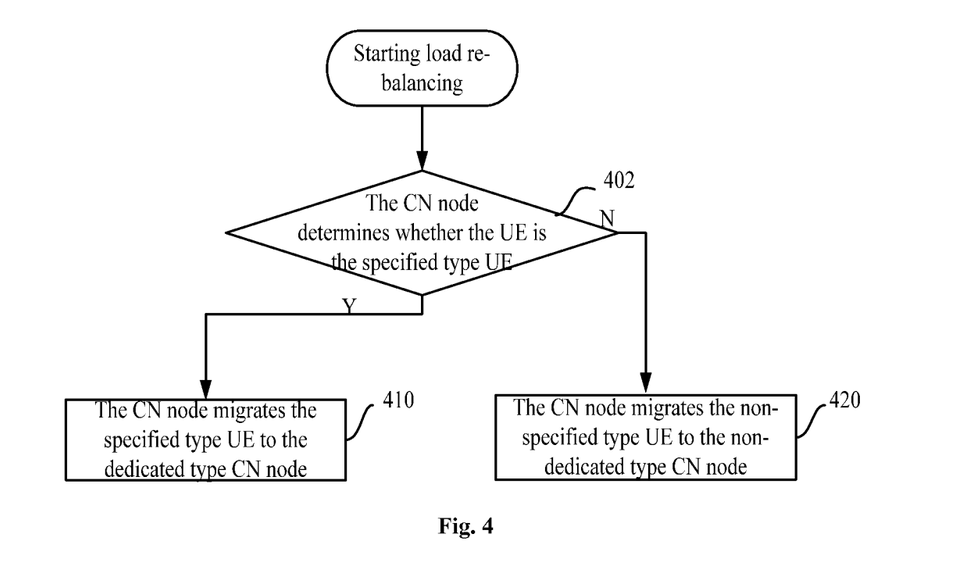
FIG. 4 is a flow chart showing a method for balancing a CN node after the dedicated CN node starts off a load re-balancing.

FIG. 4 is a flow chart showing a method for balancing a CN node in the CN pool according to an embodiment of the present disclosure, which describes a procedure for balancing a CN node triggered by the dedicated type CN node which initiates the load re-balancing. The dedicated CN node supports both the specified UE and the non-specified type UE and therefore among the UEs it is serving, there may be both the specified UEs and the non-specified UEs. When the dedicated type CN node needs to migrate all or part of the UEs it is serving to other CN nodes in the pool area where the dedicated type CN node exists because of maintenance or other reasons (such as jam or overload), the following steps are performed for each UE.

In step 401, the CN node determines the type of the UE and if the type of the UE is the specified type, step 410 is performed; otherwise step 420 is performed.

The method for the CN node to determine the type of the UE is the same as that shown in FIG. 2 and will not be illustrated in detail here.

In step 410, when the UE is the specified type UE, the CN node migrates the specified type UE to another dedicated CN node in the CN node pool. The another dedicated CN node may support both the specified type UE and the non-specified type UE or may only support the specified type UE.

In step 420, when the UE is the non-specified type UE, the CN node migrates the non-specified type UE to the non-dedicated type CN node in the CN pool. The dedicated type CN node may only support the specified type UE or may support both the specified type UE and the non-specified type UE.

In the above procedure, the method for the CN node to migrate the UE may be the same as that shown in FIG. 2. That is to say, based on the load balancing mechanism, the CN node selects the target CN node for the UE according to the type of the UE, sets the identifier of the target CN node in the subscriber temporary identifier and sends the subscriber temporary identifier to the UE, and urges the UE to initiate the second access request based on the load re-balancing mechanism.

From the above description, it may be seen that when the dedicated type CN node initiates the load re-balancing, it may determine the target CN node for the UE according to the type of the UE and migrate the UE to the target CN node so that a suitable CN node may be balanced according to the type of the UE, which satisfies the need of employing the dedicated type CN node for the specified type UE. In addition, the load balancing mechanism and the load re-balancing mechanism are adopted in the embodiment of the present disclosure and therefore the load balancing between CN nodes may be achieved. Moreover, in the embodiment of the present disclosure, the subscriber's contract information or the subscriber information is configured at the device at the network side and the CN node determines whether the UE is the specified type UE according to the subscriber's contract information or the subscriber information, which may avoid reconstructing the devices both at the UE side and at the network side and is easy for implementation.

Figure 5:
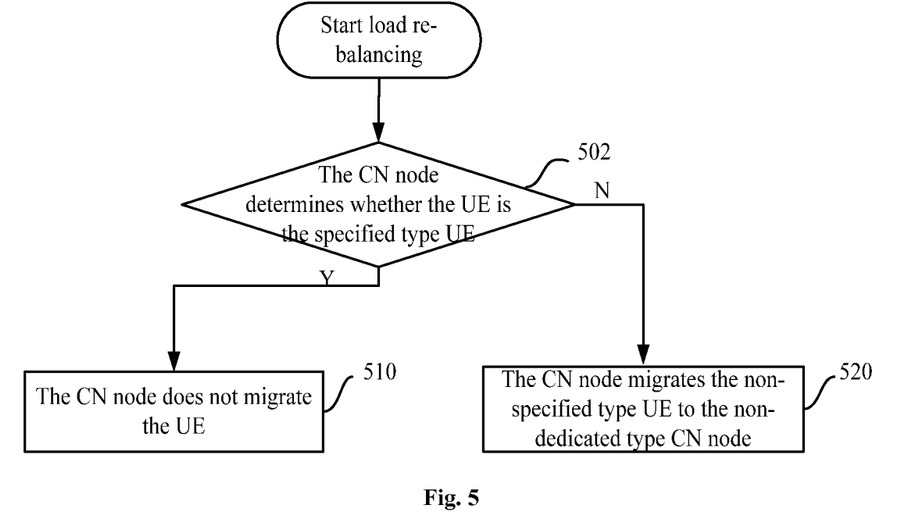
FIG. 5 is another flow chart showing a method for balancing a CN node after the dedicated CN node starts a load re-balancing.

FIG. 5 is a flow chart showing another method for balancing a CN node in the CN pool according to an embodiment of the present disclosure, which is substantially the same as that described in FIG. 4 except for the following differences: the dedicated type CN node needs to migrate the non-specified type UEs among all the UEs it is serving to other CN nodes in the pool area where the dedicated type CN node exists while does not need to migrate the specified UEs. In this case, the following steps are performed for each UE which is served by the dedicated type CN node.

In step 501, the CN node determines the type of the UE and if the type of the UE is the specified type, step 510 is performed; otherwise step 520 is performed.

The method for the CN node to determine the type of the UE is the same as that shown in FIG. 2 and will not be illustrated in detail here.

In step 510, when the UE is the specified type UE, the CN node may do nothing, i.e, may not migrate the specified type UE.

In step 520, when the UE is the non-specified type UE, the CN node migrates the non-specified type UE to the non-dedicated type CN node in the CN pool.

In the above procedure, the method for the CN node to migrate the UE may be the same as that shown in FIG. 2. That is to say, based on the load balancing mechanism, the CN node selects the target CN node for the UE according to the type of the UE, sets the identifier of the target CN node in the subscriber temporary identifier and sends the subscriber temporary identifier to the UE, and urges the UE to initiate the second access request based on the load re-balancing mechanism.

Similarly, if the dedicated type CN node needs to migrate the non-specified type UEs among all the UEs it is serving to other CN nodes in the pool area where the dedicated type CN node exists, the method is similar with the above procedure for each UE served by the dedicated type CN node.

From the above description, it may be seen that when the dedicated type CN node which supports both the non-specified type UE and the specified type UE initiates the load re-balancing, it may determine the target CN node for the UE according to the type of the UE and migrate the UE to a suitable CN node according to the type of the UE. In addition, the load balancing mechanism and the load re-balancing mechanism are adopted in the embodiment of the present disclosure and therefore the load balancing between CN nodes may be achieved. Moreover, in the embodiment of the present disclosure, the subscriber's contract information or the subscriber information is configured at the device at the network side and the CN node determines whether the UE is the specified type UE according to the subscriber's contract information or the subscriber information, which may avoid reconstructing the devices both at the UE side and at the network side and is easy for implementation.

When the non-dedicated type CN node re-balances the load, since the UEs it is serving are the non-specified type UEs, it may migrate all or part of the UEs it is serving to other non-dedicated type CN nodes in the pool area where the dedicated type CN node exists according to needs. Similarly, when the dedicated type CN node which only supports the specified type UE re-balances the load, since the UEs it is serving are the specified type UEs, it may migrate all or part of the UEs it is serving to other dedicated type CN nodes (comprising the dedicated type CN node which only supports the specified type UE, and the dedicated type CN node which supports both the specified type UE and the non-specified type UE) in the pool area where the dedicated type CN node exists according to needs. The detailed implementation may be similar with the above flow and will not be illustrated in detail here.

In order to reduce the number of the passive second access requests from the UE in the CN node pool area, in the above embodiments of the present disclosure, the weight factor for the RAN node to select the dedicated type CN node and the weight factor for the RAN node to select the non-dedicated type CN node may be adjusted according to the predetermined number ratio between the specified type UEs and the non-specified type UEs, i.e. the weight factors for selecting different type of network devices may be set. When the CN node has enough capacity, the setting of the weight factors has the following advantages.

If the number of the specified type UEs is less than the number of the non-specified type UEs, the weight factor for the RAN node to select the dedicated type CN node is less than the weight factor for the RAN node to select the non-dedicated type CN node.

If the number of the specified type UEs is larger than the number of the non-specified type UEs, the weight factor for the RAN node to select the dedicated type CN node is larger than the weight factor for the RAN node to select the non-dedicated type CN node.

Based on the same technical concepts as the above, embodiments of the present disclosure also provide several CN node devices which may applied in the above procedures.

Figure 6:
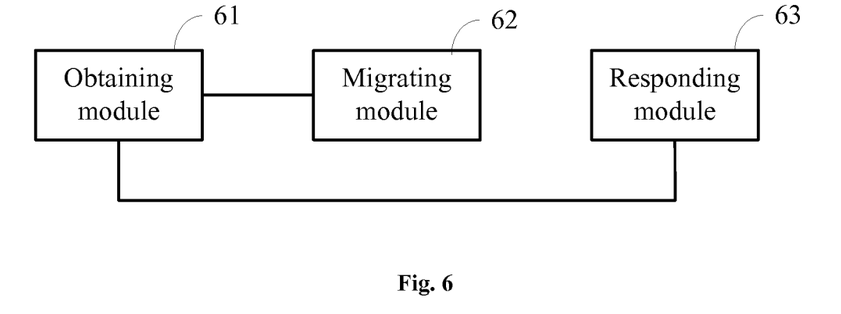
FIG. 6 is a schematic diagram showing a structure of a CN node device according to an embodiment of the disclosure.

FIG. 6 is a schematic diagram showing a structure of a CN node device according to an embodiment of the disclosure. As shown in FIG. 6, the network device (such as the CN node device) which may be applied in the procedure shown in FIG. 2 or FIG. 3 may comprise: an obtaining module 61 and a migrating module 62.

The obtaining module 61 is configured to determine a type of a UE after receiving an access request from the UE.

The migrating module 62 is configured to migrate the UE to a second network device whose type corresponds to the type of the UE when determining the UE is to be migrated according to the type of the UE.

If the network device is a non-dedicated type network device, the migrating module 62 is configured to migrate the UE to a dedicated type network device when determining that the UE is to be migrated in the condition that the UE is a specified type UE; or If the network device is a dedicated type network device, the migrating module 62 is configured to migrate the UE to a non-dedicated type network device when determining that the UE is to be migrated in the condition that the UE is a non-specified type UE.

The network device may further comprise a responding module 63 which is configured to enable the UE to access the network device when determining the UE is not to be migrated.

In the network device, the migrating module 62 may be configured to determine a type of a target network device to which the UE is to be migrated according to the type of the UE; and to select a first target device and send an identifier of the first target device to the UE and the UE initiates a second access request to the first target device according to the identifier.

Further, the migrating module 62 may be configured to select the first target network device according to a load balancing mechanism.

Further, the migrating module 62 may be configured to set a node identifier of a temporary identifier of the UE as the identifier of the first target device; and send the temporary identifier to the UE.

Figure 7:
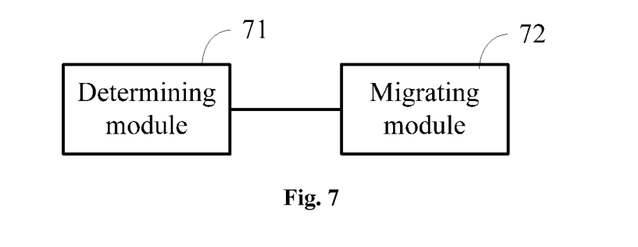
FIG. 7 is another schematic diagram showing a structure of a CN node device according to an embodiment of the disclosure.

FIG. 7 is a schematic diagram showing a structure of a CN node device according to an embodiment of the disclosure. As shown in FIG. 7, the network device (such as the CN node device) which may be applied in the procedure shown in FIG. 4 or FIG. 5 may comprise: a determining module 71 and a migrating module 72. The network device is the dedicated type network device which supports both the specified type UE and the non-specified type UE.

The determining module 71 is configured to determine a type of a UE being served.

The migrating module 72 is configured to migrate the UE to a network device whose type corresponds to the type of the UE according to the type of the UE.

In the above network device, the migrating module 72 may be configured to: migrate the specified type UE to a dedicated type network device when the UE is a specified type UE; and/or migrate the non-specified type UE to a non-dedicated type network device or to a dedicated type network device which supports the non-specified type UE when the UE is a non-specified type UE.

In the above network device, the determining module 71 is configured to determine the type of the UE being served according to subscriber contract information of a subscriber of the UE, or a number segment to which the UE belongs.

Figure 8:
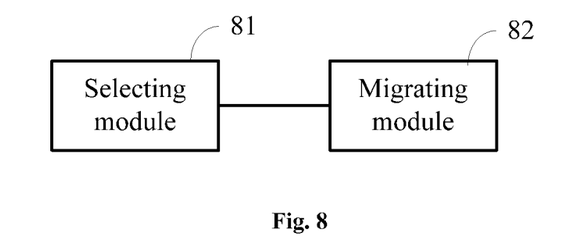
FIG. 8 is still another schematic diagram showing a structure of a CN node device according to an embodiment of the disclosure.

FIG. 8 is a schematic diagram showing a structure of a CN node device according to an embodiment of the disclosure. As shown in FIG. 8, the network device (such as the CN node device) may comprise: a selecting module 81 and a migrating module 82. The network device is the non-dedicated type network device which supports only the non-specified UE or the dedicated type network device which supports only the specified type UE.

The selecting module 81 is configured to select a second network device whose type is same as that of a first network device which serves a UE when the UE is determined to be migrated.

The migrating module 82 is configured to migrate the UE to the second network device selected by the selecting module 81.

When the above network device is the dedicated type network device, the selecting module 81 may be configured to select the dedicated type network device which supports only the specified type UE and/or the dedicated type network device which supports both the specified type UE and the non-specified type UE as the second network device whose type is same as that of the first network device.

An embodiment of the present disclosure further provides a communication system. The communication system comprises: an access node and a network device. The access node is configured to forward an access request from a UE to the network device. The network device is configured to receive the access request from the UE, obtain a type of the UE, determine whether the UE is to be migrated according to the type of the UE and if yes, migrate the UE to a network device of a corresponding type.

In the above communication system, the access nodes sets a weight factor for selecting each type of network device according to a number of each type UE, selects the network device according to the weight factor and forwards the access request from the UE to the selected network device.

It should be noted that although the above embodiments are described with reference to CN nodes, those skilled in the art may understand that the above technical solutions may be applied to network devices of other types so as to re-balance the load at network devices.

Those skilled in the art may clearly understand that the present disclosure may be implemented by software combining with a necessary general purpose hardware platform (in most cases) or by the hardware according to the description of the above embodiments. Based on this understanding, the essence of the present disclosure or the contribution of the present disclosure to the conventional art may be represented by the software product. The software product is stored in a storage medium, comprising several instructions to enable the computer device (such as the personal computer, server or CN node device) to implement the method of different embodiments of the present disclosure.

Those skilled in the art may understand that the accompanied drawings are only schematic diagrams of preferred embodiments and the blocks or procedures in the accompanied drawings are not necessarily needed to implement the present disclosure.

Those skilled in the art may understand that the modules in the embodiment may be distributed in the device of the embodiment as described but may also be distributed in one or more devices of different embodiments. The modules in the embodiment may be combined into one single module or may be split into multiple sub-modules.

The sequence number of the embodiment is only used for description and does not represent the priority of the embodiment.

Although explanatory embodiments have been shown and described, it would be appreciated that all the changes that may occur to those skilled in the art may fall into the scope of the present disclosure.

What is claimed is:

1. A method for re-balancing a load, comprising:
    determining a type of a User Equipment (UE) after receiving an access request from the UE by a first network device;
    determining whether the UE is to be migrated according to a correspondence between the type of the UE and the type of the first network device; and
    if yes, migrating the UE to a second network device whose type corresponds to the type of the UE,
    wherein migrating the UE to a second network device whose type corresponds to the type of the UE comprises:
    determining a type of target network devices according to the type of the UE;
    selecting a first target device among the target network devices and sending an identifier of the first target device to the UE; and
    initiating by the UE a second access request to the first target device according to the identifier.

2. The method according to claim 1, wherein determining whether the UE is to be migrated comprises:
    when the type of the UE and the type of the first network device do match, determining the UE is not to be migrated; and
    when the type of the UE and the type of the first network device do not match, determining the UE is to be migrated.

3. The method according to claim 1, wherein:
    if the first network device receiving the access request is a non-dedicated type network device, then the non-dedicated type network device determines that the UE is to be migrated when the UE is a specified type UE and migrates the UE to a dedicated type network device; or
    if the first network device receiving the access request is a dedicated type network device, then the dedicated type network device determines that the UE is to be migrated when the UE is a non-specified type UE and migrates the UE to a non-dedicated type network device.

4. The method according to claim 3, wherein before receiving an access request from a UE by a first network device, further comprises:
    sending by a UE an access request to a network device in a network device pool through an access node;
    setting by the access node a weight for each type of network device according to a number of each type of UE;
    selecting a first network device according to the weight; and
    forwarding the access request to the first network device.

5. The method according to claim 1, further comprising:
    enabling the UE to access the first network device when determining the UE is not to be migrated.

6. The method according to claim 1, wherein the first target network device is selected according to a load balancing mechanism; or
    sending an identifier of the first target device to the UE comprises:
    setting a node identifier of a temporary identifier of the UE as the identifier of the first target device; and
    sending the temporary identifier to the UE.

7. The method according to claim 1, wherein determining a type of the UE comprises:
    determining the type of the UE, according to subscriber contract information of a subscriber of the UE, or a number of the subscriber of the UE, or a number segment to which a device number of the UE belongs.

8. A network device, comprising:
    an obtaining module, configured to determine a type of a User Equipment (UE) after receiving an access request from the UE; and
    a migrating module, configured to migrate the UE to a second network device whose type corresponds to the type of the UE when determining the UE is to be migrated according to a correspondence between the type of the UE and the type of the network device,
    wherein the migrating module is configured to:
    determine a type of a target network device according to the type of the UE; and
    select a first target network device and send an identifier of the first target network device to the UE, and wherein the UE initiates a second access request to the first target network device according to the identifier.

9. The network device according to claim 8, wherein:
    if the network device is a non-dedicated type network device, the migrating module is configured to migrate the UE to a dedicated type network device when determining that the UE is to be migrated in the condition that the UE is a specified type UE; or
    if the network device is a dedicated type network device, the migrating module is configured to migrate the UE to a non-dedicated type network device when determining that the UE is to be migrated in the condition that the UE is a non-specified type UE.

10. The network device according to claim 8, further comprising:
    a responding module, configured to enable the UE to access the network device when determining the UE is not to be migrated.

11. The network device according to claim 8, wherein the migrating module is configured to select the first target network device according to a load balancing mechanism; or
    the migrating module is configured to set a node identifier of a temporary identifier of the UE as the identifier of the first target network device; and send the temporary identifier to the UE.

12. A method for migrating a load, applicable to a non-dedicated type network device which supports only a non-specified UE or to a dedicated type network device which supports only a specified type UE, comprising:
    selecting a second network device whose type is same as that of a first network device serving a UE when the UE is determined to be migrated; and
    migrating the UE to the second network device by the first network device, wherein migrating the UE to the second network device by the first network device comprises:

determining a type of target network devices according to the type of the UE;

selecting a first target device among the target network devices and sending an identifier of the first target device to the UE; and initiating by the UE a second access request to the first target device according to the identifier.

13. The method according to claim 12, wherein when the first network device which migrates the UE is the dedicated type network device, the second network device whose type is same as that of the first network device comprises:

the dedicated type network device which supports only the specified type UE; or the dedicated type network device which supports both the specified type UE and the non-specified type UE.

14. A network device being a non-dedicated type network device which supports only a non-specified UE or a dedicated type network device which supports only a specified type UE, comprising:

a selecting module, configured to select a second network device whose type is same as that of a first network device serving a UE when the UE is determined to be migrated; and a migrating module, configured to migrate the UE to the second network device selected by the selecting module;

wherein the migrating module is configured to:

determine a type of a target network device according to the type of the UE; and select a first target network device and send an identifier of the first target network device to the UE, and wherein the UE initiates a second access request to the first target network device according to the identifier.

15. The network device according to claim 14, wherein when the first network device is the dedicated type network device, the selecting module is configured to select the dedicated type network device which supports only the specified type UE or the dedicated type network device which supports both the specified type UE and the non-specified type UE as the second network device whose type is same as that of the first network device.

* * * * *